(12) United States Patent
MacCanti et al.

(10) Patent No.: US 9,244,958 B1
(45) Date of Patent: Jan. 26, 2016

(54) DETECTING AND RECONCILING SYSTEM RESOURCE METADATA ANOMOLIES IN A DISTRIBUTED STORAGE SYSTEM

(71) Applicant: Amazon Technologies, Inc., Reno, NV (US)

(72) Inventors: Maximiliano MacCanti, Belevue, WA (US); Jai Vasanth, Seattle, WA (US); Medhavi Dhawan, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 399 days.

(21) Appl. No.: 13/917,320

(22) Filed: Jun. 13, 2013

(51) Int. Cl.
*G06F 17/30* (2006.01)

(52) U.S. Cl.
CPC .... *G06F 17/30303* (2013.01); *G06F 17/30002* (2013.01); *G06F 17/30292* (2013.01); *Y10S 707/956* (2013.01); *Y10S 707/966* (2013.01); *Y10S 707/9994* (2013.01); *Y10S 707/99941* (2013.01)

(58) Field of Classification Search
CPC .................. G06F 17/30002; G06F 17/30292; Y10S 707/956; Y10S 707/966; Y10S 707/9994
See application file for complete search history.

(56) References Cited

U.S. PATENT DOCUMENTS

| | | | |
|---|---|---|---|
| 6,351,776 B1 | 2/2002 | O'Brien et al. | |
| 6,353,446 B1 * | 3/2002 | Vaughn | H04L 41/22 709/203 |
| 8,104,087 B2 * | 1/2012 | Quinn | G06F 11/0748 717/172 |
| 8,396,895 B2 | 3/2013 | Miloushev et al. | |
| 2012/0259901 A1 | 10/2012 | Lee et al. | |
| 2012/0284317 A1 | 11/2012 | Dalton | |
| 2013/0013958 A1 | 1/2013 | Leggette | |
| 2013/0036088 A1 | 2/2013 | Orenstein et al. | |

* cited by examiner

*Primary Examiner* — Cheryl Lewis
(74) *Attorney, Agent, or Firm* — Robert C. Kowert; Meyertons, Hood, Kivlin, Kowert & Goetzel, P.C.

(57) ABSTRACT

A system that implements detection and reconciliation of system resource metadata for a distributed storage system is described. A node may obtain resource metadata specific to the node from another node that maintains system resource metadata for a distributed storage system. Based on the resource metadata specific to the node, a determination may be made that the node is not reconciled with the system resource metadata. A corrective operation may be performed to reconcile the node with the system resource metadata. A corrective operation may include terminating a resource, making unavailable a resource, modifying resource attributes, or sending a resource metadata update to system resource metadata for correction.

20 Claims, 7 Drawing Sheets

DETECTING AND RECONCILING SYSTEM RESOURCE METADATA ANOMOLIES IN A DISTRIBUTED STORAGE SYSTEM

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may distribute and/or replicate that data across two or more machines, often in different locations, for any of a number of reasons, including security issues, disaster prevention and recovery issues, data locality and availability issues, etc. These machines may be configured in any number of ways, including as a shared resource pool. If a partition gets too large, it may be split into smaller partitions (each stored on a different machine) or moved to another machine. Similarly, various other operations, such as storing additional data, may cause configuration or allocation changes among machines. In the face of these types of changes, maintaining current configuration and allocation information about the resources available on different machines is a challenge, especially as configuration and allocation information are important for providing reliability and consistency of the database. Thus, resolving inconsistencies in the configuration and allocation information resources across database systems helps distributed database systems maintain accuracy.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement a detection and reconciliation of system resource metadata for a distributed storage system. System resource metadata may allow distributed systems to track and/or account for the allocation and configuration of resources in a distributed system. One or more nodes implementing a distributed system may maintain this system resource metadata for the distributed system. Updates, or changes to the may be received and recorded based on or in response to changes the allocation or configuration of resources in the distributed system. Nodes in the distributed system may, in some embodiments, be configured to dynamically or automatically detect errors or anomalies in the system resource metadata. For detected system resource metadata anomalies, these nodes may perform a variety of different reconciliation operations.

The specification first describes an example network-based distributed storage service configured to implement detection and reconciliation for system resource metadata anomalies for distributed storage systems. Included in the description of the example network-based database service are various aspects of the example network-based storage service, such as administrative and separate storage node instances. The specification then describes flowcharts of various embodiments of methods for detecting and reconciling system resource metadata anomalies for distributed storage systems. Next, the specification describes an example system that may implement the disclosed techniques. Various examples are provided throughout the specification.

As noted above, in various embodiments, a distributed system may maintain or track information regarding the current configuration of the distributed system. This information, referred to herein as system resource metadata, may be maintained as part of a control plane or administrative system configured to manage or coordinate operations among a plurality of devices, such as compute nodes or other computing devices (e.g., computing system 1000 in FIG. 7). For example, in some embodiments, system resource metadata may be maintained by a single tracking system or data store so that a consistent view of system resource metadata is presented. Alternatively, in other embodiments, additional backup or redundant copies of system resource metadata may also be stored in order to ensure greater reliability and durability of the system resource metadata. Different data structures, data types, or other kinds of formats may be employed to store system resource metadata, such as in one or more database tables. For instance, system resource metadata may be organized according to different logical arrangements of the resources (e.g., by replica group) or according to different physical arrangements of the resources (e.g., all of the resources maintained by a particular computing device).

When accessed, system resource metadata may present a dynamic view of resource allocation and configuration of a distributed system's resources. Generally, system resource metadata may include any information indicating the allocation of resources (e.g., the location of particular data, functions, current uses, etc. . . . ) and/or the configuration of the resources (e.g., various performance attributes such as the determined or actual throughput for a resource, such as Input/Output Operations (IOPS)). For example, system resource metadata may for a particular resource, such as a particular replica of data maintained at the distributed storage system, describe the physical location, address range, or other indicator of the node, system, storage device, etc., of the replica, as well as various other memberships or arrangements including the replica (such as a replica group). Various other types of system resource metadata may describe the relationship between various physical (e.g., computing system 1000 in FIG. 7 below) or logical systems (e.g., virtual instances) and other systems. For instance, system resource metadata may store mapping information, or other types of indicators, that describe the configuration of a particular computing cluster implementing a portion of the distributed storage system, such as which nodes perform the master or slave roles in the computing cluster. As can be ascertained from the examples presented above, numerous types of information regarding the allocation and configuration of system resources may be envisioned as system resource metadata, and therefore, the previous examples are not intended to be limiting.

Updates or changes to system resource metadata may be trigger by many different operations performed by a distributed system. For example, in some embodiments operations that assign, acquire, configure, and/or release system resources may trigger changes to system resource metadata. In various embodiments, for instance, systems described herein may store data in replicated partitions on multiple storage nodes (which may be located in multiple data centers) and may implement a single master failover protocol. Each partition may be replicated on two or more storage nodes (or storage devices thereof) in a distributed database system, where those replicas make up a replica group. In some embodiments, membership in various replica groups may be adjusted through replicated changes, and membership and other updates in the system may be synchronized by synchronizing over a quorum of replicas in one or more data centers at failover time. These membership changes may trigger or instigate updates to system resource metadata for the distributed storage system. In another example, when a database table is created, various resources may be provisioned for the implementation of that table, including storage resources (e.g., disk capacity), and throughput capacity configured for these resources (which may, e.g., be specified in terms of input/output requests per second, or IOPS, for read operations and/or write operations). The provisioning and configuring of these resources may necessitate updates to system resource metadata.

In another example, in some embodiments changes to currently allocated or configured resources may trigger updates to system resource metadata. For instance, if a table is divided into two or more partitions (e.g., if various data items are stored on different ones of the partitions according to their primary key values), the provisioned resources may also be divided among the partitions. Therefore, if a database table is divided into two partitions, each partition may have access to some portion (e.g., half) of the total amount of storage and/or throughput resources. A change to this division of resources may be recorded in system resources metadata. In another example a resource may be relocated. For instance, a partition replica may be moved, which may involve creating one or more copies of a partition (or partition replica) on respective storage nodes (or storage devices thereof) and then redirecting at least some of the subsequent requests that target the partition to the new copy (or copies).

Changes to system resource metadata may be reported in a variety of different ways. In some embodiments, a master node of a cluster of nodes, or some other device, may report on system resource metadata changes affecting nodes or devices within a particular cluster or group. A master node may, for instance, send a termination request for a particular resource to nodes within its computing cluster, and then report the change to a control plane or other administrative node/system to be updated in system resource metadata. Individual nodes or devices may also be configured to report or send updates to the system resource metadata for changes affecting the allocation or configuration of resources they currently host. In some embodiments, a distributed system scanner, sweeper, or some other system may query for resource metadata and then update system resource metadata with any previously unknown changes.

Metadata anomalies, sometimes referred to as metadata drift, may occur when system resource metadata does not provide a current state of the configuration or allocation of distributed systems. For example, consider the scenario where a master node has sent a terminate resource command to the slave nodes of a cluster. If one (or more) of the nodes does not receive the message (such as due to transport/network error, inability to receive the message because of performing some other operation, reboot, etc. . . . ) and the master node updates the system resource metadata to reflect that the slaves nodes no longer maintain the resource, then the slave node of the cluster that did not terminate its resource may be orphaned. A metadata anomaly now exists, as the system resource metadata does not accurately depict the resource maintained at the orphaned slave node.

Figure 1:
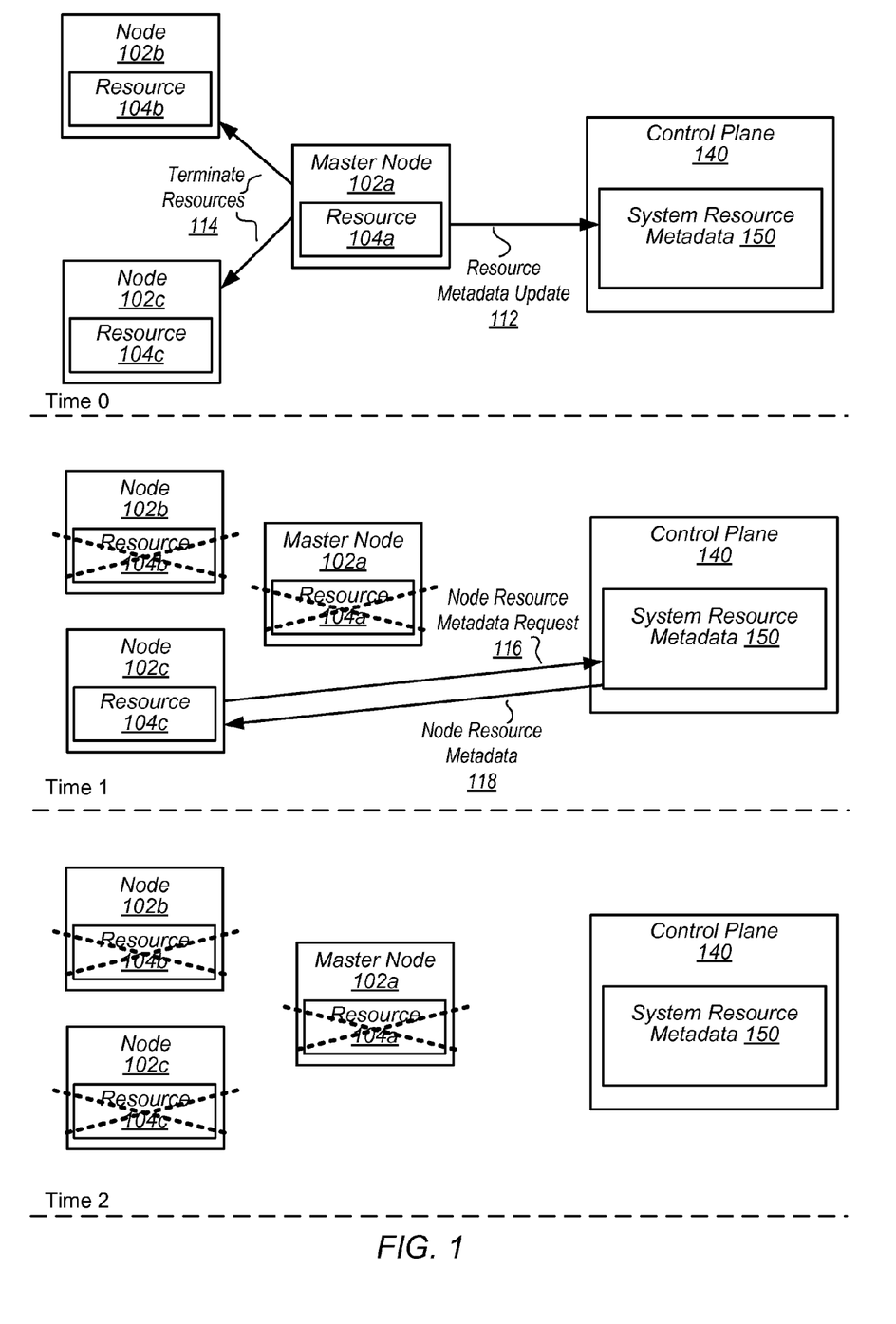
FIG. 1 is a series of block diagrams illustrating detection and reconciliation of system resources metadata for a distributed storage system, according to some embodiments.

Various techniques may be implemented to detect and reconcile the orphaned slave node, as well as other metadata anomalies. FIG. 1 is a series of block diagrams illustrating detection and reconciliation of system resources metadata for a distributed storage system, according to some embodiments. At time 0, an example of cluster nodes that includes master node 102a, node 102b, and node 102c may be implemented as part of a distributed system, such as the distributed storage service described in further detail below. Each node may maintain one or more respective resources for the cluster/distributed system. Master node 102a maintains resource 104a. Node 102b maintains resource 104b, and node 102 maintains resource 104c. Control plane 140 may be one or more other nodes that provide control and administrative functions for the distributed system. Control plane 140 may also include a data store or system for tracking system resource metadata 150. In response to some detected event, (such as the receipt of termination command/request from control plane 140 or as part of some other operation), master node 102a may send a terminate resource message 114 to node 102b and node 102c. Master node 102a may also send a resource metadata update 112 to control plane 140 to update system resource metadata 150.

Time 1 illustrates an example of a metadata anomaly, according to some embodiments. In response to receiving terminate resources message 114, node 102b has terminated (or made unavailable) resource 104b. Likewise, master node 102a has also terminated resource 104a. Node 102c, however, has not terminated resource 104c. Node 102c may have been performing some other operation or reboot that prevent its receiving terminate resources message 114. Alternatively, terminate resources message 114 may been lost due to some network error or failure. Whatever the reason, node 102c has failed to receive (or respond to) terminate resource request 114. In various embodiments, node 102c may be configured to detect this metadata anomaly. At some time, such as periodically, or in response to other determinations of a possible metadata anomaly, node 102c may send a node resource metadata request 116 to control plane 140, requesting resource metadata specific to node 102c. Node resource metadata 118 specific to node 102c may be sent to node 102c. Node resource metadata 118 may include the current allocation and/or configuration information maintained in system resource metadata 150 that describes node 102c. Node 102c may perform self-analysis based on the received resource metadata specific to the node 118. For instance, node 102c may compare the resource metadata specific to the node 118 to local resource information. Based on this on the received metadata specific to the node 118, node 102c may detect the metadata anomaly and perform a corrective operation to reconcile node 102c with system resource metadata 150. In the instant case, node 102c may terminate (or make unavailable) resource 104c, as illustrated at time 2. However, as described in further detail below, many different types of corrective operations for reconciliation may be performed, and thus, the illustration in FIG. 1 is not intended to be limiting.

Figure 2:
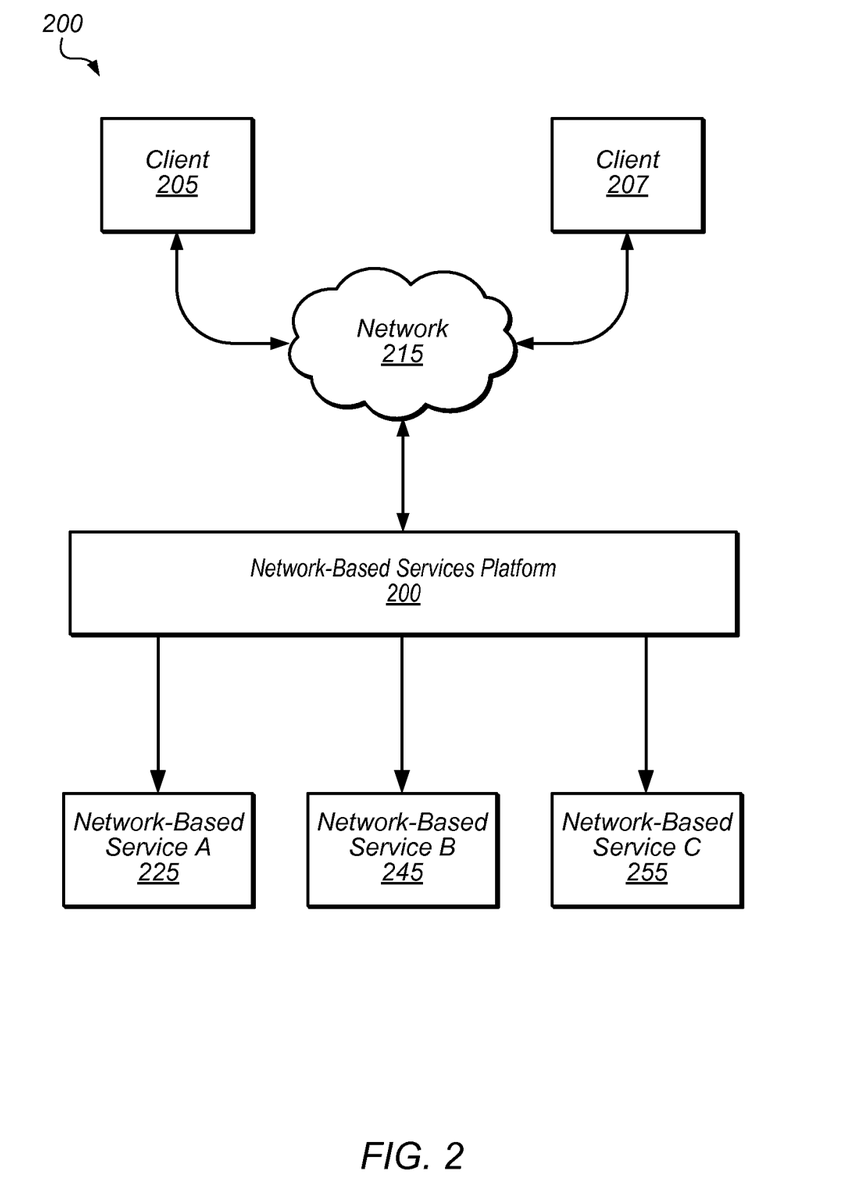
FIG. 2 is a block diagram illustrating an example operating environment for network-based services, according to some embodiments.

Various techniques described herein may be employed in local or remote computing systems, including systems that provide services to users (e.g., subscribers) over the Internet or over other public or private networks, such as virtual private networks and connections to services in a virtual private cloud (VPC) environment. FIG. 2 illustrates a block diagram of a system that provides various network-based services to clients, according to one embodiment. In this example, system 200 includes one or more clients 205. In this example, the client's 205 may be configured to interact with a network-based services platform 200 via a communication network 215.

As illustrated in this example, the network-based services platform 200 may be configured to process requests from clients 205 for various services, such as network-based service A (225), network-based service B (245), and network-based service C (255), and to return results to the clients 205. Network-based services platform 200 may also perform various accounting, metering, billing, or other administrative functions for the offered network-based services, such as logging client use of each service and generating a corresponding charger for an account associated with a particular customer. Each of the network-based services may provide clients with one or more of: computational resources, database services, data storage services (e.g., maintaining data in one or more tables on behalf of a client), or any other types of services or shared resources.

Figure 3:
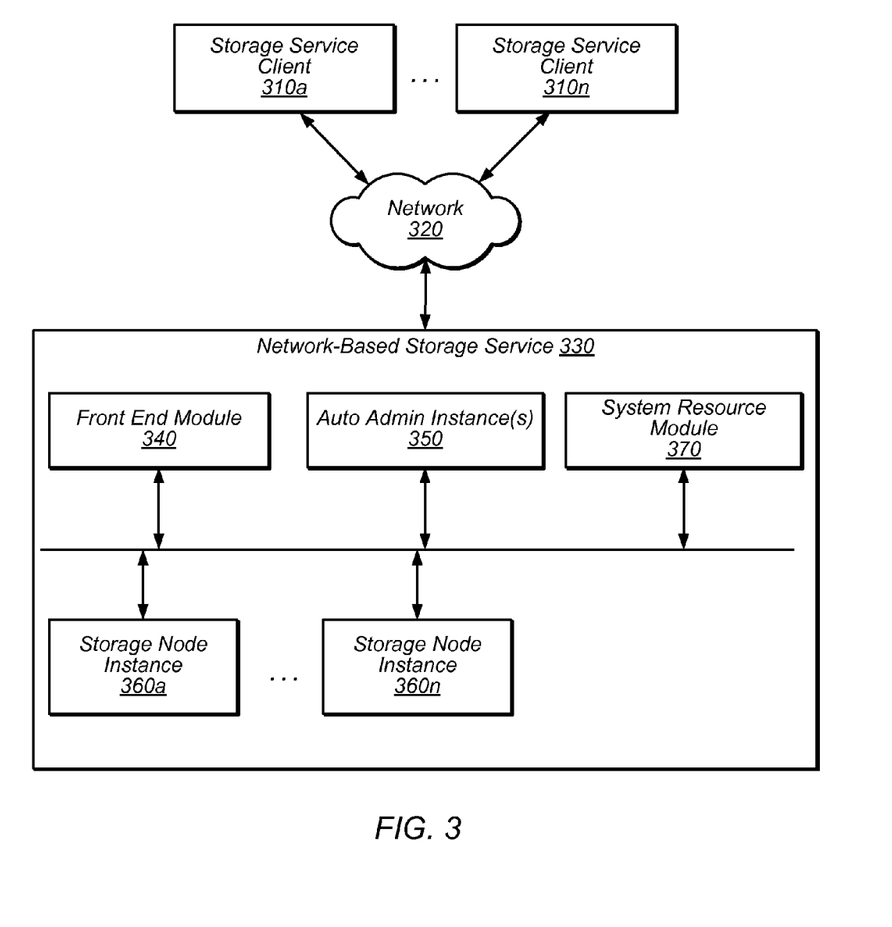
FIG. 3 is a block diagram illustrating a network-based storage service, according to some embodiments.

One embodiment of a system architecture that is configured to implement a network-based distributed storage service such as that described herein is illustrated in FIG. 3. It is noted that where one or more instances of a given component may exist, reference to that component herein below may be made in either the singular or the plural. However, usage of either form is not intended to preclude the other. In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a distributed system including a number of computing nodes (or simply, nodes), such as computing system 1000 in FIG. 7 described below. In various embodiments, the functionality of a given storage service system component may be implemented by a particular computing node or may be distributed across several computing nodes. In some embodiments, a given computing node may implement the functionality of more than one storage service system component.

Generally speaking, storage service clients 310a-310n may encompass any type of client configurable to submit web services requests to Web services platform 330 via network 320. For example, a given storage service client 310 may include a suitable version of a web browser, or a plug-in module or other type of code module configured to execute as an extension to or within an execution environment provided by a web browser to provide database or data storage service clients (e.g., client applications, users, and/or subscribers) access to the services provided by Web services platform 330. Alternatively, a storage service client 310 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 310 may be an application configured to interact directly with Web services platform 330. In various embodiments, storage service client 310 may be configured to generate web services requests according to a Representational State Transfer (REST)-style web services architecture, a document- or message-based web services architecture, or another suitable web services architecture.

In some embodiments, storage service client 310 may be configured to provide access to web services-based storage to other applications in a manner that is transparent to those applications. For example, storage service client 310 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to Web services platform 330 may be coordinated by storage service client 310 and the operating system or file system on behalf of applications executing within the operating system environment.

Storage service clients 310 may convey web services requests to and receive responses from Web services platform 330 via network 320. In various embodiments, network 320 may encompass any suitable combination of networking hardware and protocols necessary to establish web-based communications between clients 310 and platform 330. For example, network 320 may generally encompass the various telecommunications networks and service providers that collectively implement the Internet. Network 320 may also include private networks such as local area networks (LANs) or wide area networks (WANs) as well as public or private wireless networks. For example, both a given client 310 and Web services platform 330 may be respectively provisioned within enterprises having their own internal networks. In such an embodiment, network 320 may include the hardware (e.g., modems, routers, switches, load balancers, proxy servers, etc.) and software (e.g., protocol stacks, accounting software, firewall/security software, etc.) necessary to establish a networking link between given client 310 and the Internet as well as between the Internet and Web services platform 330. It is noted that in some embodiments, storage service clients 310 may communicate with Web services platform 330 using a private network rather than the public Internet. For example, clients 310 may be provisioned within the same enterprise as the data storage service (and/or the underlying system)

described herein. In such a case, clients 310 may communicate with platform 330 entirely through a private network 320 (e.g., a LAN or WAN that may use Internet-based communication protocols but which is not publicly accessible).

Generally speaking, network-based storage service 330 may be configured to implement one or more service endpoints configured to receive and process web services requests, such as requests to access tables maintained on behalf of clients/users by a database service or a data storage service, and/or the items and attributes stored in those tables. For example, network-based storage service 330 may include hardware and/or software configured to implement various service endpoints and to properly receive and process HTTP-based web services requests directed to those endpoints. In one embodiment, network-based storage service 330 may be implemented as a server system configured to receive web services requests from clients 310 and to forward them to various components that collectively implement a data storage system for processing. In other embodiments, network-based storage service 330 may be configured as a number of distinct systems (e.g., in a cluster topology) implementing load balancing and other request management features configured to dynamically manage large-scale web services request processing loads.

As illustrated in FIG. 3, network-based storage service 330 may include a front end module 340 (which may be configured to receive, authenticate, parse, throttle and/or dispatch service requests, among other things), one or more administrative components, or auto admin instances, 350 (which may be configured to provide a variety of visibility and/or control functions, as described in more detail herein), a plurality of storage node instances (shown as 360a-360n), each of which may maintain and manage one or more tables on behalf of clients/users or on behalf of the data storage service (and its underlying system) itself, and a system resource module 370 (which may be configured track and store system resource metadata for resources maintained by network-based storage service 330). Some of the functionality provided by each of these types of components is described in more detail herein, according to various embodiments. Note that in some embodiments, network-based storage service 330 may include different versions of some of the components illustrated in FIG. 3 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 3. Note also that in various embodiments, one or more database instances may be implemented on each of the storage nodes 360a-360n, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, network-based storage service 330 may be configured to support different types of web services requests. For example, in some embodiments, network-based storage service 330 may be configured to implement a particular web services application programming interface (API) that supports a variety of operations on tables that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments network-based storage service 330 may implement various client management features. For example, platform 330 may coordinate the metering and accounting of client usage of web services, including storage resources, such as by tracking the identities of requesting clients 310, the number and/or frequency of client requests, the size of tables and/or items stored or retrieved on behalf of clients 310, overall storage bandwidth used by clients 310, class of storage requested by clients 310, and/or any other measurable client usage parameter. Network-based storage service 330 may also implement financial accounting and billing systems, or may maintain a database of usage data that may be queried and processed by external systems for reporting and billing of client usage activity. In some embodiments, network-based storage service 330 may include a lock manager and/or a bootstrap configuration (not shown).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. The amount of work required to satisfy service requests that specify these operations may vary depending on the particular operation specified and/or the amount of data that is accessed and/or transferred between the storage system and the client in order to satisfy the request.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, a partition replica may be assigned to a particular storage node based largely (or solely) on whether there is enough storage capacity for the anticipated size of the table. For example, the anticipated size may be based on information included in a request to create the table, on usage history for the client on whose behalf the table was created, or on a history of accesses that target the table, the partition, or the replica itself (e.g., if this is a partition replica that is being reassigned as part of a move operation). In such embodiments, there may or may not be enough throughput capacity for the partition replica on the selected storage node (or storage device thereof). For example, a disk to which the partition replica is assigned may be oversubscribed in terms of IOPS, the actual number of IOPS may be more than was expected, or the provisioned (or committed) number of IOPS may have grown after the partition replica was created (e.g., using an UpdateTable operation to increase the provisioned throughput capacity for read operations and/or write operations). In some embodiments, an UpdateTable operation may be invoked by a client through a graphical user interface (GUI). In other embodiments, an UpdateTable operation may be invoked through an UpdateTable API whose inputs include an identifier of the table for which additional throughput capacity is desired, a desired (e.g., increased) number of IOPS for read operations and/or a desired (e.g., increased) number of IOPS for write operations. In some or all of these cases, the partition replica may need to be moved to another storage node (or storage device) or split into two new (smaller) partitions, each of which may be hosted on a different storage device (or storage node).

In various embodiments, a database service or data storage service may be implemented on one or more computing nodes that are configured to perform the functionality described herein. In some embodiments, the service may be implemented by a network-based storage service (such as network-based storage service 330 in FIG. 3) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other Web services or applications, in some embodiments).

In some embodiments, the database systems described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

In some embodiments, a service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

A data storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. Similarly, resources that are pre-allocated to other types of services to support a committed work throughput model may in some cases be underutilized (at least some of the time), but may provide the client/user with a predictable level of performance (e.g., in terms of availability and/or responsiveness).

As described herein, in some embodiments the systems described herein may support both a multi-tenant model and a single-tenant model. In such some embodiments, the client/user may indicate a preferred one of these tenancy models for a particular table through a parameter of a request to create the table. In other embodiments, a client/user may specify a default or initial tenancy model for all tables created and maintained on their behalf by the data storage service.

Figure 4A:
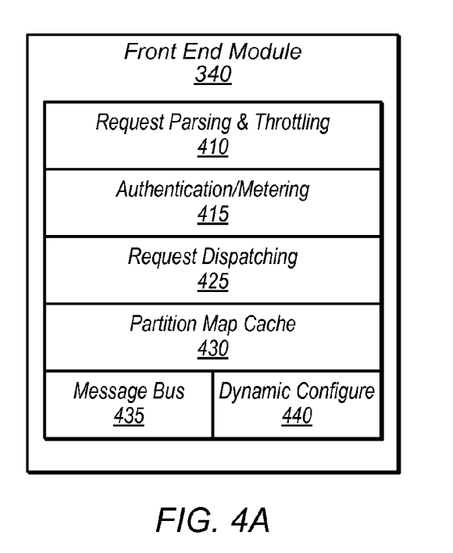
FIGS. 4A-4D are block diagrams illustrating various components of a network-based storage service, according to some embodiments.

FIGS. 4A-4D illustrate various elements or modules that may be included in each of the types of components of network-based storage service 330, according to one embodiment. As illustrated in FIG. 4A, front end module 340 may include one or more modules configured to perform parsing and/or throttling of service requests (shown as 410), authentication and/or metering of service requests (shown as 415), dispatching service requests (shown as 425), and/or maintaining a partition map cache (shown as 430). In addition to these component-specific modules, front end module 340 may include components that are common to multiple types of computing nodes that collectively implement Web services platform 330, such as a message bus (shown as 435) and/or a dynamic configuration module (shown as 440). In other embodiments, more, fewer, or different elements may be included in front end module 340, or any of the elements illustrated as being included in front end module 340 may be included in another component of network-based storage service 330 or in a component configured to interact with network-based storage service 330 to provide the data storage services described herein.

Figure 4B:
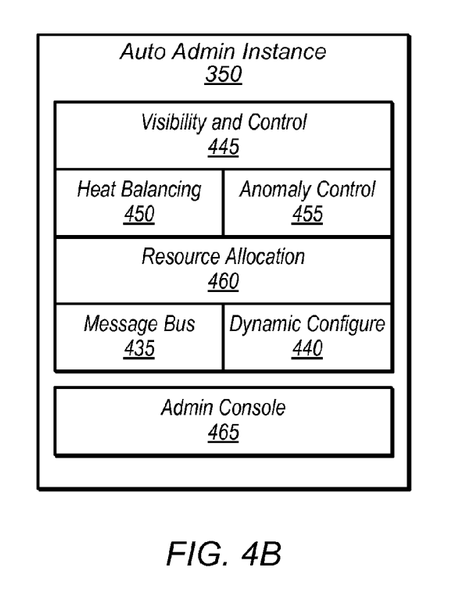

As illustrated in FIG. 4B, auto admin instance 350 may include one or more modules configured to provide visibility and control to system administrators (shown as 445), or to perform heat balancing (shown as 450), and/or anomaly control (shown as 455), resource allocation (shown as 460). In some embodiments, resource allocation module 460, heat balancing module 450, and/or anomaly control module 455 may be configured to work separately or in combination to perform selection, ordering, or scheduling of candidate partition management operations (e.g., various partition splitting operations or partition moving operations), as described in more detail below. Auto admin instance 350 may also include an admin console 465, through which system administrators may interact with the data storage service (and/or the underlying system). In some embodiments, admin console 465 may be the primary point of visibility and control for the data storage service (e.g., for configuration or reconfiguration by system administrators). For example, admin console 465 may be implemented as a relatively thin client that provides display and control functionally to system administrators and/or other privileged users, and through which system status indicators, metadata, and/or operating parameters may be observed and/or updated.

In addition to these component-specific modules, auto admin instance 350 may also include components that are common to the different types of computing nodes that collectively network-based storage service 330, such as a message bus (shown as 435) and/or a dynamic configuration module (shown as 440). In other embodiments, more, fewer, or different elements may be included in auto admin instance 350, or any of the elements illustrated as being included in auto admin instance 350 may be included in another component of network-based storage service 330 or in a component configured to interact with network-based storage service 330 to provide the data storage services described herein.

Figure 4C:
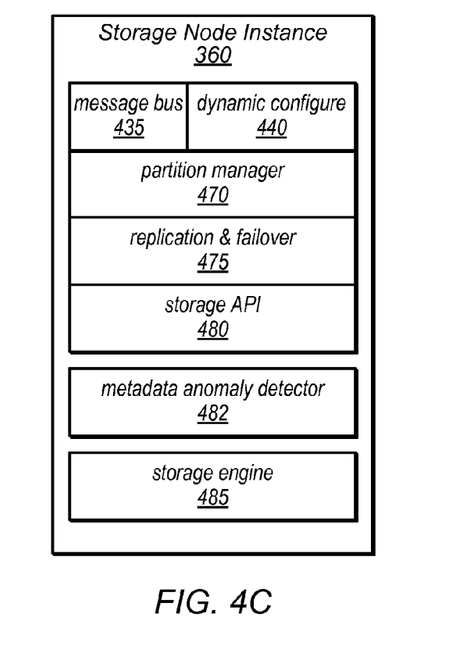
Figure 4D:
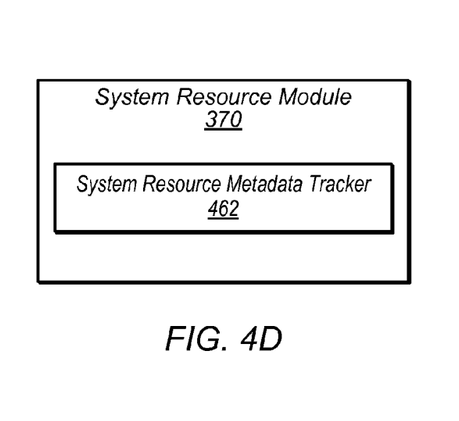

As illustrated in FIG. 4D, system resource module 370 may be configured to provide a system resource metadata tracker 462, in various embodiments. System resource module 370 may be globally visible or accessible to other nodes, systems, or devices as part of network-based storage services. As discussed above, system resource metadata may be maintained for the allocation and configuration of resources. System resource metadata tracker may be configured to manage and/or update system resource metadata for network-based storage service 330, or some other distributed storage system. In some embodiments, system resource metadata tracker may maintain system resource metadata in one or more tables of database, which may be stored physically one or more store devices. Various system components, such as resource allocation module 460, dynamic configure module 440, storage node instance(s) 360, and/or front end module 340 may be configured to send updates and requests to system resource metadata tracker 462. System resource metadata tracker 462 may be configured to respond with requested system resource data, such as the resource metadata specific to a particular storage node instance, such as storage node instance 360.

As illustrated in FIG. 4C, storage node instance 360 may include one or more modules configured to provide partition management (shown as 470), to implement replication and failover processes (shown as 475), and/or to provide an application programming interface (API) to underlying storage (shown as 480). In some embodiments, the partition manager 470 (or another component of storage node instance 360) may be configured to identify candidate partition management operations to be performed locally (e.g., on a given storage node instance 360) based, e.g., on one or more measures of the utilization of provisioned resources on the storage devices or logical storage volumes of the storage node instance. Partition manager 470 may also perform various ones of the methods and techniques discussed below to detect and reconcile system resource metadata anomalies for partitions, in some embodiments.

Storage node instance 360 may include, in various embodiments, a metadata anomaly detector 482. Metadata anomaly detector may be configured to detect one or more metadata anomalies that exist between the storage node instance and system resource metadata maintained for the distributed storage service. Various methods for detection and reconciliation which may be implemented by metadata anomaly detector are discussed below with regard to FIGS. 5 and 6. For example, metadata anomaly detector 482 may be configured to periodically request resource metadata specific to storage node instance 360. This resource metadata may then be received and compared with local resource information (such as local metadata, configuration information, diagnostic processes, or other sources of current information about the resources maintained at storage node instance 360). A resource, for example, may in various embodiments be any data or function that is allocated or assigned to a storage node. In some embodiments, a resource may be a replica of data maintained for providing reliability and durability for data stored at a distributed storage service. Based, at least in part, on the comparison between local resource information and the resource metadata obtained specific to storage node instance 360, metadata anomalies may be identified.

Metadata anomaly detector 482 may additionally, in some embodiments, be configured to direct or perform a corrective operation to reconcile storage node instance 360 with system resource metadata. For example, if a resource is maintained or available at storage node 360 that is not indicated as maintained by the resource metadata, then metadata anomaly detector 362 may be configured to make unavailable or direct the termination of a resource such that storage node instance 360 current state is reconciled with system resource metadata. In another example, if a resource is indicated as maintained at storage node instance 360 by resource metadata, such as a particular replica of data, that metadata anomaly detector 362 determines is not maintained at storage node instance 360, then metadata anomaly detector 362 may send a notification or alert indicating that the resource is not maintained at the node. In at least some embodiments, the storage node instance 360 may send a request for the resource to be provided to storage node instance 360 and/or send an update to system resource metadata tracker indicating that the resource is not maintained at the storage node. Difference between attribute values for resources may also be detected by metadata anomaly detector 362, which may then perform analysis and/or corrective operations, such as indicating or sending an alert indicating that the attribute values differ or modifying the attribute values of the resources to reflect those values indicated in system resource metadata, such as after delaying for a certain amount of time to ensure that the local information at storage node instance 360 is current.

As illustrated in this example, each storage node instance 360 may include a storage engine 485, which may be configured to maintain (i.e. to store and manage) one or more tables (and associated table data) in storage 480 (which in some embodiments may be a non-relational database) on behalf of one or more clients/users. In addition to these component-specific modules, storage node instance 360 may include components that are common to the different types of computing nodes that collectively implement Network-based storage service 330, such as a message bus (shown as 435) and/or a dynamic configuration module (shown as 440). In other embodiments, more, fewer, or different elements may be included in storage node instance 360, or any of the elements illustrated as being included in storage node instance 360 may be included in another component of network-based storage service 330 or in a component configured to interact with network-based storage service 330 to provide the data storage services described herein.

Note that in some embodiments, it may not be necessary to perform some or all of the throttling, authentication, and/or metering operations that would typically be provided by front end module 340 in multi-tenant environments for tables operating in a single-tenant environment. For example, the system may be configured to elide these operations when servicing requests directed to tables in a single-tenant environment, but to perform them when servicing requests directed to tables in a multi-tenant environment. Similarly, in some embodiments, some of the operations illustrated as being performed by auto admin instance 350 (e.g., heat balancing and/or resource allocation) may or may not be applied in managing tables in a single-tenant environment. However, other operations illustrated as being performed by auto admin instance 350 (or various modules thereof) may be applied in the creation and/or management of tables in both multi-tenant and single-tenant environments.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, traditional database schemes may be employed, such as the various types of relational databases implemented using Server Query Language (SQL).

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited. These attributes may also be described by system resource metadata and anomalies between these attributes and system resource metadata may be detected.

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes and/or to re-configure various tables (e.g., in response to the findings presented in a skew report). These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase the provisioned throughput capacity for a given table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API. Note that the amount of work required to satisfy service requests that specify these operations may vary depending on the particular operation specified and/or the amount of data that is accessed and/or transferred between the storage system and the client in order to satisfy the request.

Figure 5:
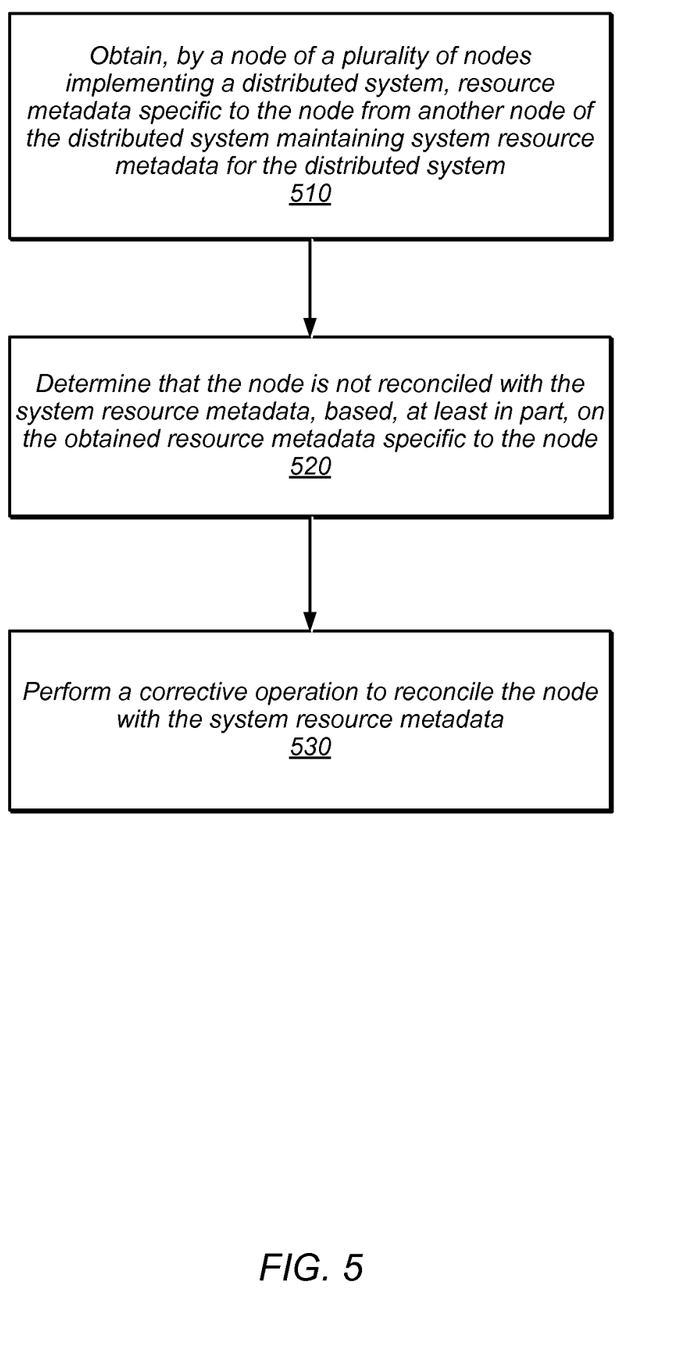
FIG. 5 is a high-level flowchart illustrating a method for detecting and reconciling system resource metadata anomalies for a distributed system, according to some embodiments.

As noted above, various different techniques and methods may be implemented to detect and reconcile metadata anomalies for distributed storage systems. Various different components of a distributed storage system may implement the methods and techniques described below with regard to FIGS. 5 and 6. In at least some embodiments, a node may automatically detect, or self-identify metadata anomalies that exist between its current state and system resource metadata maintained for a distributed storage system. FIG. 5 is a high-level flowchart illustrating various methods for detecting and reconciling system resource metadata anomalies for a distributed system, according to some embodiments.

As indicated at 510, a node that is part of a group of nodes implementing a distributed system may obtain resource metadata specific to the node from another node in the distributed system that maintains system resource metadata for the distributed system, in various embodiments. A node may issue one or more request messages to obtain the resource metadata. The node may provide identification information, such as a node id, resource id, group id or other indicator or value that may be used to determine from the maintained system resource metadata which resource metadata is specific to the requesting node. For instance a node that is maintaining a replica of data as part of a replica group for the data may provide a replica group identifier, so that resource metadata returned to the node may include information specifically about the identified replica group. In at least some embodiments, all or mostly all resource metadata maintained about a node may be sent in response to a request for resource metadata.

As indicated at 520, in some embodiments it may be determined that the node is not reconciled with the system resource metadata based, at least in part, on the obtained resource metadata. In at least some embodiments, a comparison between the obtained resource metadata and local metadata may be made. For example, a listing of data replicas maintained at the node may be received and checked against a local index that provides a listing of all replicas of data maintained at the node. Extra replicas or missing replicas may indicate resource metadata anomalies. In some embodiments, various diagnostic processes or techniques may be employed. For instance, if resource metadata indicates that a particular resource, such as a partition of a table is to be provided with a certain amount of space and certain amount IOPS, a storage device scan, or I/O rate monitoring process may be performed to determine if the attributes of the resource are anomalous with the values of the attributes as described by the resource metadata. As many other comparisons, evaluations, or analyses may be performed on the obtained resource metadata specific to the node, the previous examples are not intended to be limiting.

Figure 6:
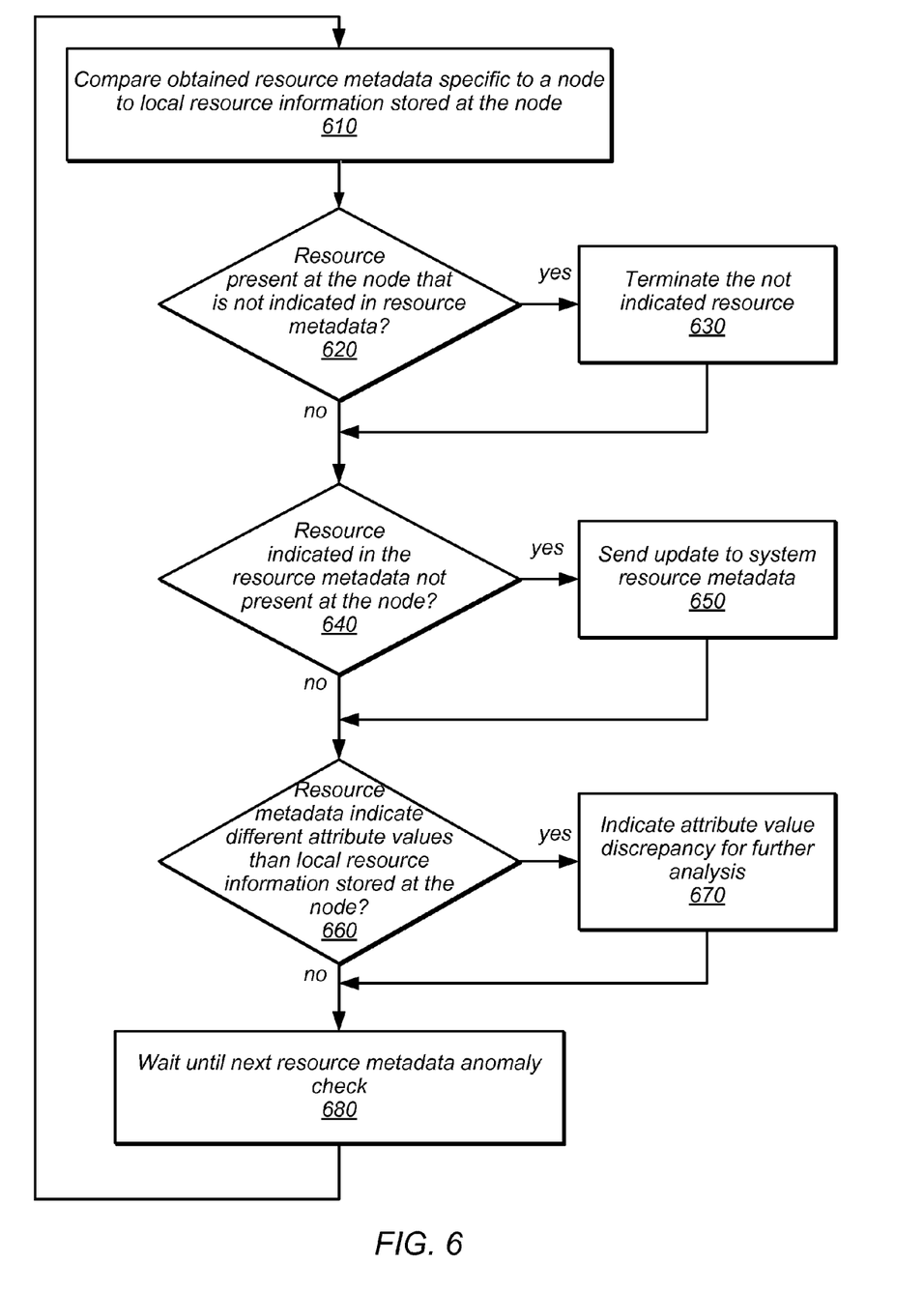
FIG. 6 is a high-level flowchart illustrating various methods for reconciling system resource metadata anomalies for a distributed system, according to some embodiments.

In response to determining that the node is not reconciled with the system resource metadata, a corrective operation may be performed to reconcile the node with the system resource metadata, in some embodiments, as indicated at 530. Various different types of corrective operations may be performed. FIG. 6 is a high-level flowchart illustrating various methods for reconciling system resource metadata anomalies for a distributed system, according to some embodiments.

As indicated at 610, the obtained resource metadata specific to a node may be compared to local resource information stored at the node. Various different types of metadata anomalies may be detected based on this comparison. Corrective operations to reconcile a node may be determined based on the types of metadata anomalies detected. As indicated at 620, it may be determined whether a resource is present at the node that is not indicated in the resource metadata specific to the node. If yes, then the resource may be terminated, as indicated at 630. For example, in some embodiments, if the resource is a replica of data, then a process servicing the replica may be terminated. In some embodiments, a resource, such as a replica of data, may be preserved or made unavailable for a period of time prior to termination. Various scenarios may instigate or cause the resource not to be present. As discussed above, termination, disablement, abandonment, or various other types of messages may not be received. Various ones of the operations described above, such as various changes to the configurations of group membership, adding, deleting, splitting, or moving resources, such as tables, replicas, partitions, etc., may cause some nodes to continue to maintain resources when it is no longer desired by the distributed system. These orphans may then self-detect their metadata anomaly and terminate the resource as appropriate.

As indicated at 640, another type of metadata anomaly that may be detected is whether the resource indicated as present the resource metadata specific to the node is present at the node. In some embodiments, as illustrated, an update message may be sent to system resource metadata 650. This updated may allow for subsequent distributed system components to correct the deficient resource. More generally, in some embodiments a notification or alert may be sent, such as to another node (e.g., admin instance, master node, etc. . . . ) that indicates that the resource is not maintained at the storage node. Consider the scenario where the resource not present is a replica that belongs to a replica group. If the missing replica is required to meet some healthy replica group standard, then sending an update message to for the update of system resources metadata may instigate the detection and correction of the missing replica. Although not illustrated, in some embodiments, various other corrective actions may be taken, such as requesting the missing resource from another node that also maintains the resource.

As indicated at 660, in some embodiments it may be determined whether resource metadata specific to the node indicates different attribute values for a resource maintained at the node than local information (or some other diagnostic or source of information on the node) indicates. If the attribute values differ, then in some embodiments, the attribute value discrepancy may be indicated for further analysis, as illustrated at 670. For example, in some embodiments, a local corrective operation may be performed, such that local resource information that includes the local resource may be modified (e.g., controls that determine the local resource information may be modified or the storage node instance may be configured to set the local resource information values) to the values indicated by the resource metadata. For example, if an attribute value for resource, such as data replica, indicates a specific throughput resource value for the replica (e.g., a provisioned number of IOPS), then local information may be modified to set the specific throughput resource value at the value indicated by the resource metadata. In another example, a lag analysis may be performed. In some embodiments, upon detecting the difference in attribute values, performance of a corrective action may be delayed for a specific period of time to allow for additional updates to the local resource information. It may be subsequently determined that the storage node has a current version of the local resource information. If the local resource information is determined not to be current, then it may be that various updates to the storage node have not yet been received. However, if the storage node instance has a current version of local information and the discrepancy in attribute values is still determined to exist, then a local corrective action may then be performed. Alternatively, in some embodiments, an alert, notification, or update may be sent to system resource metadata such that other systems or components may detect and make changes sufficient to correct the anomaly or to another system, operator, or device. For example, if a provisioned amount of storage space for a partition is indicated in resource specific metadata for a node, and the actual amount of space required for the partition exceeds the provisioned amount, a move, split, or some other operation may be performed to reallocate the replica so that provisioned amounts are maintained.

As illustrated at 680, the detecting and correcting metadata anomalies may be performed multiple times, such as by waiting for a next metadata anomaly check. Metadata anomaly checks may be performed periodically (e.g., by setting a timer), or aperiodically (e.g., when current system resources allow for the detection and reconciliation operations to be performed as background processes). In at least some embodiments, a node may perform an analysis or determine that there is a possible metadata anomaly. For example, if node storing a replica for a replica group does not receive any responses from other replica group members (or receives error messages or unexpected messages), then the node may determine that possible metadata anomaly exists.

The previous flowcharts illustrate just some of the various methods and techniques that may be implemented to detect and reconcile system resource metadata anomalies for a distributed storage system, and are not intended to be limiting. Various other elements or orderings of elements may be performed in addition to or instead of those depicted.

Figure 7:
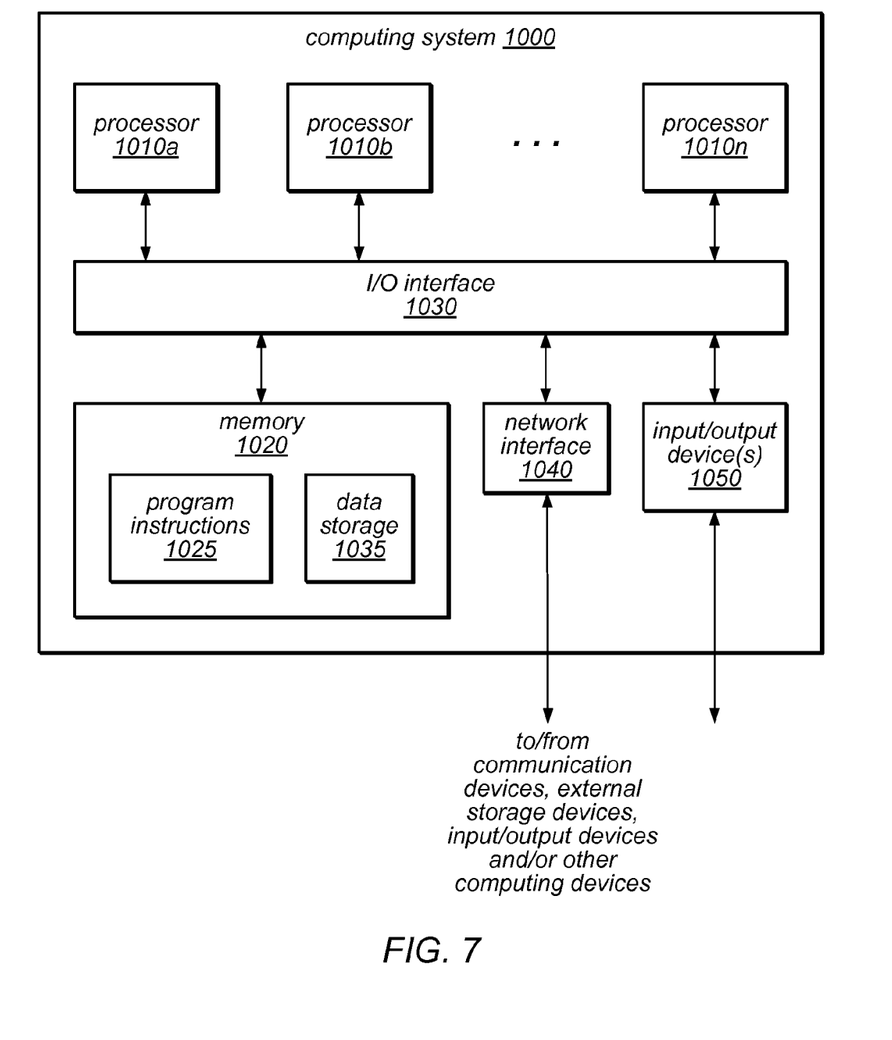
FIG. 7 is a block diagram of a computing system configured to implement the various methods and techniques described herein, according to some embodiments.

Embodiments of detecting and reconciling system resource metadata anomalies for distributed storage systems as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions 1025 and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, configured to implement the various embodiments of detecting and reconciling system resource metadata anomalies for distributed storage systems as described herein, and data store 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a plurality of compute nodes implemented on one or more computing devices and configured to implement a distributed storage service;

wherein a control plane node of the plurality of compute nodes is configured to maintain system resource metadata for the distributed storage service;

wherein at least one storage node of the plurality of compute nodes is configured to detect one or more resource metadata anomalies;

wherein, to detect one or more resource metadata anomalies, the at least one storage node is configured to:

request resource metadata specific to the at least one storage node from the control plane node;

receive the resource metadata specific to the at least one storage node;

compare the received resource metadata with local resource information maintained at the least one storage node;

based, at least in part, on the comparison, identify the one or more resource metadata anomalies; and wherein, the at least one storage node is further configured to:

for each of the detected one or more resource metadata anomalies, perform a corrective operation to reconcile the at least one storage node with the system resource metadata.

2. The system of claim 1, wherein the resource metadata specific to the at least one storage node indicates that a replica of data maintained by the distributed storage service is not stored at the at least one storage node, wherein the local resource information maintained at the at least one storage node indicates that the replica is stored at the at least one storage node, and wherein to perform the corrective operation to reconcile the at least one storage node with the system resource metadata, the at least one storage node is configured to terminate a process servicing the replica at the at least one storage node.

3. The system of claim 1, wherein the resource metadata specific to the at least one storage node indicates that a particular resource is maintained by the at least one storage node, wherein the local resource information maintained at the at least one storage node indicates that the particular resource is not maintained at the at least one storage node;

wherein to perform the corrective operation to reconcile the at least one storage node with the system resource metadata, the at least one storage node is configured to send a resource metadata update to the control plane node indicating that the particular resource is not maintained at the at least one storage node;

wherein the control plane node is further configured to update the system resource metadata for the distributed storage service in response to receiving the resource metadata update from the at least one storage node.

4. The system of claim 1, wherein the detection of one or more resource anomalies is performed by the at least one storage node periodically.

5. A method, comprising:

performing, by one or more computing devices implementing a node for a distributed system:

obtaining resource metadata specific to the node from another node of the distributed system, wherein the other node maintains system resource metadata for the distributed system;

based, at least in part, on the resource metadata specific to the node, determining that the node is not reconciled with the system resource metadata; and in response to determining that the node is not reconciled with the system resource metadata, performing a corrective operation to reconcile the node with the system resource metadata.

6. The method of claim 5, wherein said determining that the node is not reconciled with the system resource metadata, comprises:

comparing the resource metadata specific to the node with local resource information maintained at the node;

based, at least in part, on the comparison, determining that a resource maintained at the node is not indicated as maintained at the node by the resource metadata.

7. The method of claim 6, wherein the node is a storage node for a distributed storage service implemented by the distributed system, wherein the resource not indicated as maintained at the storage node by the resource metadata is a replica of data maintained by the distributed storage service, and wherein said performing the corrective operation to reconcile the node with the system resource metadata comprises terminating a process for servicing the replica at the storage node.

8. The method of claim 5, wherein said determining that the node is not reconciled with the system resource metadata, comprises:

comparing the resource metadata specific to the node with local resource information maintained at the node; and based, at least in part, on the comparison, determining that a resource is not maintained at the node when the resource metadata indicates that the resource is maintained at the node.

9. The method of claim 8, wherein said performing the corrective operation to reconcile the node with the system resource metadata comprises sending a notification indicating that the resource is not maintained at the node.

10. The method of claim 5, wherein said determining that the node is not reconciled with the system resource metadata, comprises:

comparing the resource metadata specific to the node with local resource information maintained at the node; and based, at least in part, on the comparison, determining that one or more resource attributes of the node include different values than indicated values for the one or more resource attributes of the node by the resource specific metadata.

11. The method of claim 10, wherein said performing the corrective operation to reconcile the node with the system resource metadata comprises modifying the one or more resource attributes of the node to include the indicated values for the one or more resource attributes of the node indicated by the resource specific metadata.

12. The method of claim 5, wherein said obtaining, said determining, and said performing, are performed in response to detecting a possible metadata anomaly event.

13. A non-transitory, computer-readable storage medium, storing program instructions that when executed by one or more computing devices implementing a storage node of distributed storage service cause the storage node to implement:

obtaining resource metadata specific to the storage node from another node of a plurality of nodes including the storage node together implementing the distributed storage service, wherein the other node maintains system resource metadata for the distributed storage service;

based, at least in part, on the resource metadata specific to the storage node, determining that the storage node is not reconciled with the system resource metadata; and in response to determining that the storage node is not reconciled with the system resource metadata, performing a corrective operation to reconcile the storage node with the system resource metadata.

14. The non-transitory, computer-readable storage medium of claim 13, wherein, in said determining that the storage node is not reconciled with the system resource metadata, the storage node implements:
- comparing the resource metadata specific to the storage node with local resource information maintained at the storage node;
- based, at least in part, on the comparison, determining that a resource maintained at the storage node is not indicated as maintained at the storage node by the resource metadata.

15. The non-transitory, computer-readable storage medium of claim 13, wherein, in said performing the corrective operation to reconcile the storage node with the system resource metadata, the storage node further implements identifying the resource maintained at the storage node as unavailable for further processing.

16. The non-transitory, computer-readable storage medium of claim 13,
- wherein, in said determining that the storage node is not reconciled with the system resource metadata, the storage node implements:
  - comparing the resource metadata specific to the node with local resource information maintained at the node;
  - based, at least in part, on the comparison, determining that a resource is not maintained at the node when the resource metadata indicates that the resource is maintained at the node;
- wherein, in said performing the corrective operation to reconcile the storage node with the system resource metadata, the storage node implements:
  - sending a notification indicating that the resource is not maintained at the storage node.

17. The non-transitory, computer-readable storage medium of claim 13, wherein, in said determining that the storage node is not reconciled with the system resource metadata, the storage node implements:
- comparing the resource metadata specific to the node with local resource information maintained at the node;
- based, at least in part, on the comparison, determining that one or more resource attributes of the node include different values than indicated values for the one or more resource attributes of the node by the resource specific metadata;
- wherein, in said performing a corrective operation to reconcile the storage node with the system resource metadata, the storage node further implements:
  - delaying for a specific period of time to allow for additional updates to the local resource information;
  - determining that the storage node has a current version of the local resource information; and
  - performing a local corrective operation at the storage node.

18. The non-transitory, computer-readable storage medium of claim 17, wherein one of the one or more resource attributes is a throughput provision value for a resource maintained at the storage node, and wherein, in said performing the local corrective operation, the storage node further implements configuring the storage node to set the throughput provision value to the indicated value of the resource metadata for the throughput provision value.

19. The non-transitory, computer-readable storage medium of claim 13, wherein the storage node further implements:
- detecting a possible metadata anomaly event; and
- in response to detecting the possible metadata anomaly event, performing said obtaining, said determining, and said performing.

20. The non-transitory, computer-readable storage medium of claim 13, wherein said obtaining, said determining, and said performing are performed periodically.

* * * * *